3,840,534
4H-FURO[3,4-d][1,3]THIAZINE-2-PHTHALIMIDO-2-ACETIC ACID ESTERS

Narindar N. Girotra, Fords, and Norman L. Wendler, Summit, N.J., assignors to Merck & Co., Inc., Rahway, N.J.
No Drawing. Filed July 24, 1972, Ser. No. 274,389
Int. Cl. C07d 93/06
U.S. Cl. 260—243 R       2 Claims

ABSTRACT OF THE DISCLOSURE 1,2,5,7-tetrahydro - 7 -oxo - 4H - furo[3,4-d][1,3]thiazine-2-phthalimido-2-acetic acid esters which are useful in the synthesis of cephalosporins are prepared starting with phthalimidomalonaldehydic esters.

BACKGROUND OF THE INVENTION

This invention relates to processes and chemical compounds useful in the synthesis of antibiotics. More particularly, it is concerned with processes for intermediate products which can be used in the total synthesis of cephalosporins.

Cephalosporins such as cephalothin and cephaloridine have been found to be valuable antibiotics which are very useful in human therapy. These antibiotics are generally prepared from cephalosporin C, an antibiotic substance which is produced by growing certain microorganisms in suitable fermentation media. The cephalosporin C after isolation from the fermentation broth is converted to 7-aminocephalosporanic acid by removing the aminodipoyl side chain. The 7-aminocephalosporanic acid is then reacylated to produce the cephalosporin compound having a thienylacetyl side chain. This method of preparing these antibiotics is expensive since the fermentation yield of cephalosporin C is low and the step of replacing the acyl side chain is difficult to carry out on a commercial scale in high yields. Accordingly, other methods of producing these valuable antibiotics have been avidly sought by those skilled in this art.

The total synthesis of cephalosporins have been described by several investigators. One such synthesis uses as an intermediate an ester of 1,2,5,7-tetrahydro-7-oxo-4H-furo[3,4-d][1,3]thiazine - 2 - phthalimido - 2 - acetic acid.

SUMMARY OF THE INVENTION

It is an object of this invention to provide a new synthesis of 1,2,5,7 - tetrahydro - 7 - oxo 4H-furo[3,4-d][1,3]thiazine-2-phthalimido-2-acetic acid esters. Another object is to provide new intermediate products useful in this synthesis. Other objects will be apparent from the detailed description of this invention hereinafter provided.

In accordance with the present invention, it is now found that 1,2,5,7-tetrahydro-7-oxo-4H-furo[3,4-d][1,3]thiazine-2-phthalimido-2-acetic acid esters are prepared starting with a α-phthalimidomalonaldehydic ester (II) and dihydro-3-amino-4-(mercaptomethyl)-2-(3H) - furanone (I) by the processes shown in the following flowsheet:

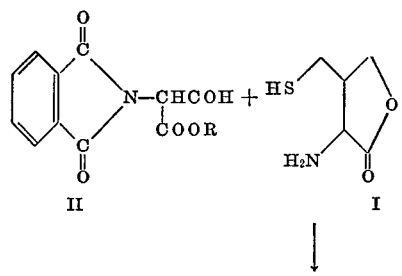

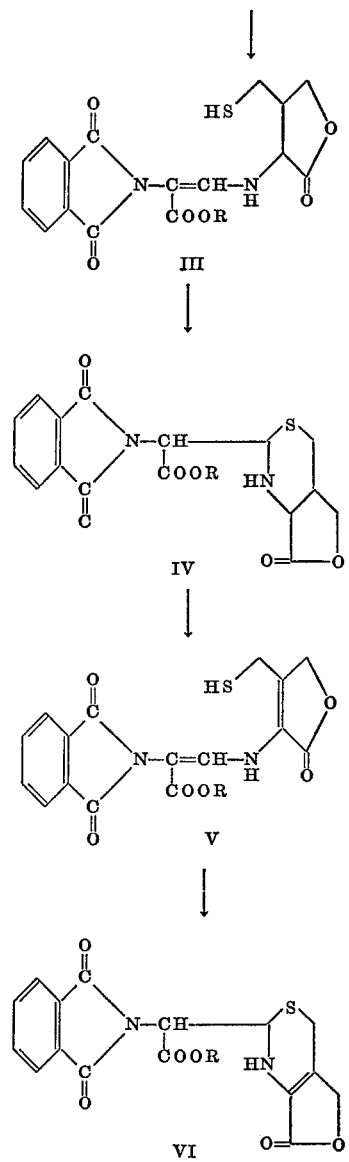

wherein R represents a lower alkyl ($C_1$–$C_6$) group.

In this process the aldehydic ester (II) is first condensed with the mercapto dihydrofuranone (I) to produce the intermediate vinyl mercapto compound (III). This product is then reacted with acid to afford a mixture of the cis and trans isomers of the tetrahydrothiazine (IV) which on reaction with a N-halosuccinimide is converted to the vinyl mercapto furanone compound (V). The latter product on treatment with a base affords the desired erythro form of the tetrahydro thiazine (VI).

The first step of this reaction sequence is readily effected by heating the aldehydic ester (II) at a temperature of 50–100° C. with an acid salt of the mercapto furanone (I) in the presence of an acid scavenger, for example a mild base such as sodium bicarbonate, in a suitable solvent medium and removing the water of reaction by azeotropic distillation. After the reaction is complete, the reaction mixture is filtered and the filtrate evaporated to afford the vinyl mercapto compound (III) as a mixture of the cis and trans isomers. Alternatively, the condensation can be effected at room temperature in an aqueous methanol solution containing a buffer such as sodium acetate. After the reaction is complete, the mixture is evaporated and the product recovered by extraction with a suitable solvent for the product.

The step of converting the vinyl mercapto compound (III) to the thiazine compound (IV) is conveniently effected by reaction with an acid at low temperatures, for example by passing gaseous HCl through a solution of the vinyl mercapto compound in methylene chloride at a temperature of —20 to —25° C. The product is readily recovered by evaporating the reaction mixture to dryness and extracting it with a suitable solvent such as ethyl acetate. The tetrahydrothiazine (IV) so obtained consists of a mixture of the erythro and threo isomers which can be separated if desired by crystallization from suitable solvents such as acetone-hexanone.

The conversion of the tetrahydrothiazine compound (IV) to the mercapto vinyl furanone (V) is conveniently effected by reaction with N-chlorosuccinimide at room temperature in the presence of a tertiary amine such as pyridine, and then treating the resulting reaction mixture with gaseous HCl at low temperature, e.g. —20 to —25° C. The product of this reaction is obtained as a mixture of the cis and trans isomers which are separated by crystallization from suitable solvents.

The mercapto vinyl furanone compound (V) is then converted to the desired dihydrothiazine compound (VI) by reaction with a base such as triethylamine or 1,4-diazabicyclo[2:2:2]octane.

In accordance with a further embodiment of our invention, the mercapto dihydrofuranone compound (I) is conveniently prepared by the reactions shown in the following flowsheet:

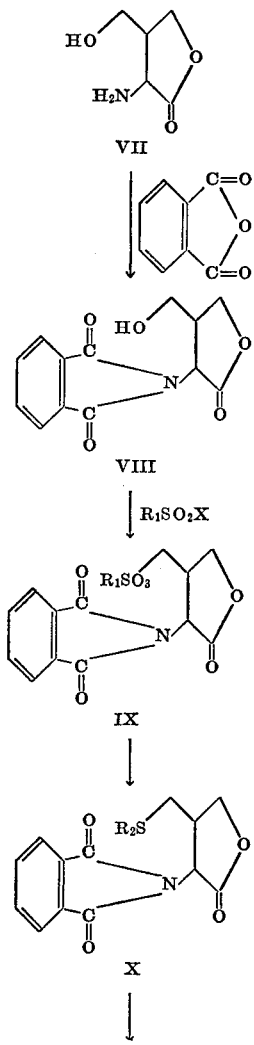

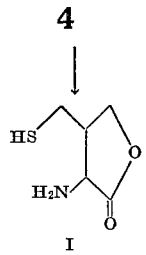

wherein $R_1$ represents lower alkyl, aryl or aralkyl and $R_2$ represents an aroyl or lower alkanoyl group.

In this reaction sequence the dihydroxy valine lactone (VII) is reacted with phthalic anhydride to produce the N-phthalimido derivative (VIII). This product on reaction with a sulfonyl halide is converted to the corresponding sulfonate (IX) which is then reacted with a salt of a thioaromatic or a thioalkanoic acid ($C_2$–$C_4$) to obtain the acylated derivative (X). The latter product on acid hydrolysis affords the desired mercapto dihydrofuranone compound (I).

The first step of converting the valine lactone (VII) to the N-phthalimido derivative is conveniently effected by heating an acid salt of the valine lactone with phthalic anhydride in the presence of a base such as triethylamine in toluene and removing the water of reaction by azeotropic distillation. After the reaction is complete, the mixture is evaporated and the product recovered from the residue by extraction with chloroform.

The next step is effected by reacting the N-phthalimido compound with an alkyl, aralkyl or monocyclic aryl sulfonyl halide such as methane sulfonyl chloride, benzyl sulfonyl chloride, or p-toluenesulfonyl chloride at 0° C. in the presence of a suitable acid scavenger such as tertiary amine. After the completion of the reaction, the mixture is quenched with ice and the sulfonyl derivative (IX) is recovered by evaporating the benzene extracts.

The step of converting the sulfonate to the acylated mercapto compound (X) is readily effected by heating with a salt of a thioaromatic or a thioalkanoic acid, for example sodium thiobenzoate or potassium thioacetate. The reaction is readily effected in a suitable solvent medium such as acetone by heating the mixture to reflux. After completion of the reaction the mixture is filtered and the filtrate evaporated to afford (X).

The final step of converting the S-acyl derivative (X) to the desired mercapto furanone (I) is effected by hydrolysis with an acid such as aqueous hydrochloric acid. After removal of the phthalic anhydride, the product is recovered from the aqueous reaction mixture to afford the desired mercapto furanone compound as a mixture of the lactone and thiolactone isomers. The desired mercapto compound is conveniently separated in the form of its mercury salt.

EXAMPLE 1

A stirred mixture of 1.0 g. of γ,γ'-dihydroxyvaline lactone hydrochloride, 0.890 g. of phthalic anhydride, 1.6 ml. of triethylamine and 40 ml. of toluene is heated to reflux for 2½ hours in a flask provided with a water separator. The reaction mixture is evaporated, the residue dissolved in chloroform and extracted with 5% hydrochloric acid twice and water once. The dried organic layer is evaporated to give 1.610 g. of foam which on crystallization from ethyl acetate-hexane affords 1.307 g. of dihydro-4-hydroxymethyl - 3 - phthalimido - 2(3H)-furnaone, m.p. 157–159° C.

IR $\lambda_{max.}^{CHCl_3}$ 2.87, 5.58, 5.62, 5.82, and 6.19μ.

EXAMPLE 2

To a stirred solution of 13.06 g. of dihydro-4-hydroxymethyl-3-phthalimido-2(3H)-furanone in 30 ml. of dry pyridine is added a solution of 28.60 g. of p-toluenesulfonyl chloride in 50 ml. of dry pyridine in 20 minutes at 0° C. After 17 hours at 0° C. the reaction mixture is quenched with ice and then made acidic with 2.5 N hydrochloric acid and finally extracted with benzene. The organic layer is in turn extracted with 2.5 N hydrochloric acid three times and water twice. The dried benzene solution is evaporated to yield 21.97 g. of semi-crystalline material which on crystallization from benzene-hexane affords 21.49 g. of dihydro-4-hydroxymethyl-3-phthalimido-2(3H)-furanone p-toluenesulfonate (m.p. 95–110° C.) containing about 0.5 mole of benzene as solvent of crystallization as indicated by NMR.

IR $\lambda_{max.}^{CHCl_3}$ 5.57, 5.62, 5.79, 6.20, 6.27, 7.25 and 8.50μ.

EXAMPLE 3

A stirred mixture of 27.26 g. of dihydro-4-hydroxymethyl-3-phthalimido - 2(3H) - furanone p - toluenesulfonate, 14.40 g. of potassium thioacetate and 550 ml. of acetone is heated to reflux for 2 hours under nitrogen. The cooled reaction mixture is filtered through diatomaceous earth and the filtrate evaporated to dryness. The residue is dissolved in chloroform and extracted with water twice. The dried organic layer is treated with charcoal and evaporated to give 20.8 g. of solid which on crystallization from benzene-hexane affords 18.41 g. of dihydro-4-(mercaptomethyl) - 3 - phthalimido - 2(3H)-furanone acetate, m.p. 171–172.5° C.

IR $\lambda_{max.}^{CHF}$ 5.57, 5.62, 5.79, 5.90 and 6.20μ.

EXAMPLE 4

A stirred suspension of 30.33 g. of dihydro-4-(mercaptomethyl)-3-phthalimido-2(3H)-furanone acetate in 250 ml. of 6 N hydrochloric acid is heated to reflux for 7 hours under nitrogen. The cooled reaction is filtered to remove phthalic anhydride. The filtrate is extracted with ether six times and combined ether layers washed with water twice. The aqueous layers are evaporated to give 20.14 g. of a mixture of dihydro-3-amino-4-(mercaptomethyl)-2(3H)-furanone hydrochloride and dihydro-3-amino - 4 - hydroxymethyl - 2(3H) - thiophenone hydrochloride (IR $\lambda_{max.}^{film}$ 5.60 and 5.89μ)

which is dissolved in 50 ml. of water and treated with an excess of saturated aqueous solution of mercuric chloride. After 1 hour at room temperature the mercury salt of dihydro-3-amino-4-(mercaptomethyl)-2-(3H)-furanone hydrochloride (21.17 g., IR $\lambda_{max.}^{Nujol}$ 5.60μ)

is isolated by filtration. The filtrate is enriched in dihydro-3-amino-4-hyldroxymethyl - 2(3H) - thiophenone hydrochloride. The solid is suspended in 150 ml. of methanol and exposed to a stream of hydrogen sulfide for 7 minutes at 5–10° C. After stirring for 20 minutes the reaction mixture is filtered through diatomaceous earth and the filtrate evaporated. The residual solid is suspended in benzene containing a small amount of methanol and filtered to give 6.78 g. of dihydro-3-amino-4-(mercaptomethyl)-2-(3H)-furanone hydrochloride, m.p. 172–175° C.

IR $\lambda_{max.}^{Nujol}$ 5.58 and 5.61μ.

The filtrate enriched in dihydro-3-amino-4-hydroxymethyl-2(3H) - thiophenone hydrochloride is treated with hydrogen sulfide gas, filtered to remove inorganic salt and the filtrate evaporated. The residue is refluxed with 5 N hydrochloric acid to reestablish the equilibrium between dihydro-3-amino-4-(mercaptomethyl) - 2(3H)-furanone hydrochloride and dihydro-3-amino-4-hydroxymethyl-2(3H)-thiophenone hydrochloride. By following the procedure described above, additional dihydro-3-amino-4-(mercaptomethyl)-2(3H) - furanone hydrochloride (ca. 2 g.) is isolated from the mixture.

EXAMPLE 5

(A) To a stirred solution of 0.275 g. of dihydro-3-amino - 4 - (mercaptomethyl)-2(3H)-furanone hydrochloride in 4 ml. of methanol and 3 ml. of water is added 0.126 g. of sodium bicarbonate followed by a solution of 0.434 g. of t-butyl α-phthalimidomalonaldehyde in 4 ml. of methanol and 50 ml. of benzene. The reaction mixture is heated to reflux in a flask provided with a Dean-Stark water separator in nitrogen. The first 40 ml. of distillate is discarded in 1 hour and the reaction mixture refluxed for an additional 3 hours. The cooled solution is filtered to remove sodium chloride and the filtrate evaporated to give 0.690 g. of dihydro-3-[(2-(tert.-butoxycarbonyl)-2-phthalimidovinyl)amino] - 4 - (mercaptomethyl)-2(3H)-furanone (cis and trans) as yellow foam. Dry column chromatography on silica gel (ethyl acetate-benzene 40:60) leads to the separation of the isomers, cis-dihydro-3-amino-4-hydroxymethyl-2(3H)-thiophenone hydrochloride, m.p. 168–171° C. (benzene-hexane) and trans, m.p. 166–168° C. (benzene-hexane).

cis-dihydro-3 - [(2-(tert.-butoxycarbonyl)-2-phthalimidovinyl)amino]-4-(mercaptomethyl)-2(3H)-furanone:

IR $\lambda_{max.}^{CHCl_3}$ 3.03, 5.59, 5.80, 5.95, 6.03 and 6.13μ. UV $\lambda_{max.}^{MeOH}$ 279 (t=18200), 237.5 (10800), 230 (12900) and 217 mμ (34000).

trans-dihydro-3-[(2 - tert. - butoxycarbonyl)-2-phthalimidovinyl)amino] - 4 - (mercaptomethyl) - 2(3H)-furanone:

IR $\lambda_{max.}^{CHCl_3}$ 3.0, 5.60, 5.82, 5.90, 6.04 and 6.10μ. UV $\lambda_{max.}^{MeOH}$ 273 (t=27400), 238 (16300), 230 (17700) and 217.5 mμ (44500).

(B) To a stirred solution of 0.165 g. of dihydro-3-amino-4-(mercaptomethyl) - 2(3H)-furanone hydrochloride in 2.4 ml. of methanol and 0.3 ml. of water is added 0.123 g. of sodium acetate trihydrate followed by 0.260 g. of t-butyl α-phthalimidomalonaldehyde at room temperature under nitrogen. The reaction becomes homogeneous in about 5 minutes to give a bright yellow solution. After 24 hours at room temperature the solution is evaporated and the residue is dissolved in benzene. The organic layer is extracted with 5% sodium bicarbonate three times and water twice. The dried benzene solution is evaporated to give 0.410 g. of dihydro-3-[(2-(tert.-butoxycarbonyl) - 2 - phthalimidovinyl)amino]-4-(mercaptomethyl)-2(3H)-furanone (trans as the major isomer) as yellow foam which is used as such in the subsequent example.

EXAMPLE 6

A stream of hydrochloric acid gas is passed through a stirred solution of 1.643 g. of the mixture of the cis and trans isomers of dihydro-3-[(2-(tert.-butoxycarbonyl)-2-phthalimidovinyl)amino] - 4 - (mercaptomethyl)-2(3H)-furanone, prepared as described in Example 5, in 125 ml. of methylene chloride for 20 minutes at −20 to −25° C. followed by nitrogen at the same temperature for 1 hour. The reaction mixture is evaporated, the residue solid is suspended in ethyl acetate and treated with 5% sodium bicarbonate. The organic layer is extracted with 5% sodium bicarbonate twice, washed with water once, dried and evaporated to give 1.420 g. of crude 1,2,4a,5,7,7a-hexahydro-7-oxo-4H-furo[3,4 - d] [1,3]thiazine-2-phthalimido-2-acetic acid tert.-butyl ester (mixture of erythro and threo isomers) as foam. The material is triturated with ethyl acetate to give a solid which on crystallization from acetone-hexane affords 0.380 g. of 1,2,4a,5,7,7a-hexahydro-7-oxo-4H-furo[3,4 - d][1,3]thiazine-2-phthalimido-2-acetic acid tert.-butyl ester as a single isomer, m.p. 164–167° C.

IR $\lambda_{max.}^{CHCl_3}$ 3.04, 5.57, 5.73, 5.80 and 6.21μ.

The mother liquor is enriched in the second isomer.

EXAMPLE 7

To a stirred solution of 1.04 g. of the erythro and threo isomers of 1,2,4a,5,7,7a - hexahydro-7-oxo-4H - furo[3,4-d][1,3]thiazine - 2 - phthalimido-2-acetic acid tert.-butyl ester in 8 ml. of dry methylene chloride is added a solution of 0.334 g. of N-chlorosuccinimide and 0.2 ml. of pyridine in 8 ml. of methylene chloride in 5 minutes at room temperature under nitrogen. After 2 hours the reaction mixture is diluted with 125 ml. of methylene chloride and exposed to a stream of hydrochloric acid gas at −20 to −25° C. followed by nitrogen for 1 hour at the same temperature. The reaction mixture is evaporated and the residue is suspended in ethyl acetate and treated with 5% sodium bicarbonate. The organic layer is extracted with 5% sodium bicarbonate twice and saturated sodium chloride twice. The dried organic layer is evaporated to give 0.760 g. of foam which after purification via dry column chromatography on silica gel (ethyl acetate-benzene 40:60) affords 0.135 g. of 4-(mercaptomethyl)-3-[(2-(tert.-butoxycarbonyl) - 2 - phthalimidovinyl)-amino]-2(5H) - furanone as a mixture of cis and trans isomers. Crystallization of the material from ethyl acetate affords 0.050 g. of crystalline 4-(mercaptomethyl)-3-[(2 - (tert.-butoxycarbonyl) - 2 - phthalimidovinyl) amino]-2(5H)-furanone as a single isomer, m.p. 211–213° C.

IR $\lambda_{max.}^{CHCl_3}$ 2.7, 3.20, 5.60, 5.67, 5.80, 5.96, 6.02, 6.12 and 11.30μ. [UV $\lambda_{max.}^{CHCl_3}$ 320 (ε=19500) and 270 mμ (8400).

EXAMPLE 8

Treatment of a solution of 4-(mercaptomethyl)-3-[(2-(tert. - butoxycarbonyl) - 2 - phthalimidovinyl)amino]-2(5H)-furanone in methylene chloride with triethylamine at room temperature for several hours followed by purification via chromatography and crystallization affords 1,2,5,7 - tetrahydro-7-oxo-4H-furo[3,4 - d][1,3]thiazine-2-phthalimido-2-acetic acid tert.-butyl ester, identical with the material obtained from base treatment of 3-[(2-(tert.-butoxycarbonyl) - 2 - phthalimidovinyl)amino]-4-(mercaptomethyl)-2(5H)-furanone acetate.

We claim:

1. A compound of the formula

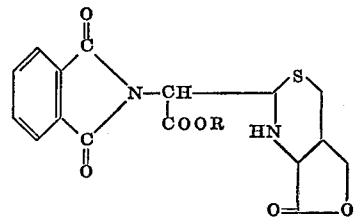

wherein R is lower alkyl.

2. 1,2,4a,5,7,7a - hexahydro-7-oxo-4H-furo[3,4-d][1,3]thiazine-2-phthalimido-2-acetic acid tert.-butyl ester.

References Cited

UNITED STATES PATENTS 3,592,810    7/1971    Dolfini _____ 260—243

OTHER REFERENCES

A. Heymes et al.: Comp. Rend., vol. 263, pp. 170 et seq. (1966).

JOHN M. FORD, Primary Examiner

U.S. Cl. X.R.

260—240 R, 326 A, 326 S, 999